US009987558B2

(12) United States Patent
Schlossberg et al.

(10) Patent No.: US 9,987,558 B2
(45) Date of Patent: Jun. 5, 2018

(54) GAME SYSTEM WITH INTERACTIVE SHOW CONTROL

(71) Applicant: Eddie's Social Club, LLC, New York, NY (US)

(72) Inventors: Edwin Schlossberg, New York, NY (US); Jeremiah J. Harris, Armonk, NY (US)

(73) Assignee: Eddie's Social Club, LLC, New York, NY (US)

( * ) Notice: Subject to any disclaimer, the term of this patent is extended or adjusted under 35 U.S.C. 154(b) by 416 days.

(21) Appl. No.: 14/167,011

(22) Filed: Jan. 29, 2014

(65) Prior Publication Data

US 2014/0213359 A1 Jul. 31, 2014

Related U.S. Application Data

(60) Provisional application No. 61/757,964, filed on Jan. 29, 2013.

(51) Int. Cl.
| | |
|---|---|
| *A63F 13/35* | (2014.01) |
| *A63F 13/27* | (2014.01) |
| *A63F 13/28* | (2014.01) |
| *F21V 23/04* | (2006.01) |
| *A63F 13/65* | (2014.01) |
| *A63F 13/216* | (2014.01) |
| *A63F 13/213* | (2014.01) |

(52) U.S. Cl.
CPC .............. *A63F 13/65* (2014.09); *A63F 13/27* (2014.09); *A63F 13/28* (2014.09); *F21V 23/045* (2013.01); *A63F 13/213* (2014.09); *A63F 13/216* (2014.09); *A63F 2300/5533* (2013.01); *A63F 2300/8023* (2013.01); *F21V 23/0442* (2013.01); *F21V 23/0471* (2013.01); *F21V 23/0478* (2013.01)

(58) Field of Classification Search
CPC .............. A63J 11/00; A63F 2300/5533; A63F 2300/8023; A63F 13/65; F21V 23/045; F21V 23/0442; F21V 23/0471; F21V 23/0478
USPC ........................................................ 446/175
See application file for complete search history.

(56) References Cited

U.S. PATENT DOCUMENTS

| | | | | |
|---|---|---|---|---|
| 5,795,228 | A * | 8/1998 | Trumbull ................ | A63F 13/12 463/42 |
| 6,166,496 | A * | 12/2000 | Lys .................... | H05B 33/0857 315/292 |
| 6,769,790 | B2 * | 8/2004 | Fruhm ...................... | F21S 2/00 362/233 |
| 7,146,011 | B2 * | 12/2006 | Yang ...................... | G10K 15/02 367/138 |
| 9,566,510 | B2 * | 2/2017 | Schlossberg ............ | A63F 13/27 |
| 9,616,335 | B2 * | 4/2017 | Schlossberg ............ | A63F 13/27 |
| 2002/0149940 | A1 * | 10/2002 | Fruhm ...................... | F21S 2/00 362/286 |
| 2003/0057884 | A1 | 3/2003 | Dowling | |

(Continued)

*Primary Examiner* — William H McCulloch, Jr.
(74) *Attorney, Agent, or Firm* — Law Office of Scott C Harris, Inc

(57) ABSTRACT

An interactive game system that stage lighting style cues as part of the game, where the stage lighting cues cause external stage lighting equipment to create effects that are based on outputs from the game. Steerable lights can be steered to the player and sounds can be created that are directed to the player. A simulation system can also simulate the actions that occur.

17 Claims, 7 Drawing Sheets

(56) References Cited

U.S. PATENT DOCUMENTS

| | | | |
|---|---|---|---|
| 2004/0056779 A1* | 3/2004 | Rast | B63B 22/16 340/985 |
| 2004/0092311 A1 | 5/2004 | Weston et al. | |
| 2004/0113939 A1* | 6/2004 | Zacks | G06F 21/84 715/741 |
| 2004/0183775 A1 | 9/2004 | Bell | |
| 2004/0264707 A1* | 12/2004 | Yang | G10K 15/02 381/77 |
| 2006/0072076 A1 | 4/2006 | Smoot et al. | |
| 2010/0118200 A1* | 5/2010 | Gelman | G06F 3/041 348/578 |
| 2012/0168516 A1* | 7/2012 | Bolger | G06K 19/07758 235/492 |
| 2014/0213359 A1* | 7/2014 | Schlossberg | A63F 13/00 463/31 |
| 2015/0209666 A1* | 7/2015 | Harris | A63F 13/27 463/31 |
| 2015/0301715 A1* | 10/2015 | Schlossberg | A63F 13/27 463/31 |
| 2015/0321090 A1* | 11/2015 | Schlossberg | A63F 13/27 463/31 |
| 2015/0321095 A1* | 11/2015 | Schlossberg | A63F 13/27 463/31 |
| 2016/0004894 A1* | 1/2016 | Tanikawa | H04B 1/59 340/10.51 |

* cited by examiner

GAME SYSTEM WITH INTERACTIVE SHOW CONTROL

This application claims priority from provisional application No. 61/757,964, filed 29 Jan. 2013, the entire contents of which are herewith incorporated by reference.

BACKGROUND

Today's game systems typically run on a computer platform. The computer can run the games, and also produces outputs to interact with the players, and receives inputs from those players. For example, the gaming system operates by automatically interacting with the players and producing sounds.

SUMMARY

The present application describes a game system that uses a number of servers that each interact with one another, and can automatically interact with multiple different external devices.

The device can interact with show control devices, e.g., stage lighting, as part of a game system. This enables lighting effects to be created in a room that are controlled by and synchronized with the game.

Another aspect describes player controlled and/or synchronized show control based on actions in an interactive game.

Another aspect describes an emulator that emulates not only actions in the game, but also in the room housing the game.

Figure 1:
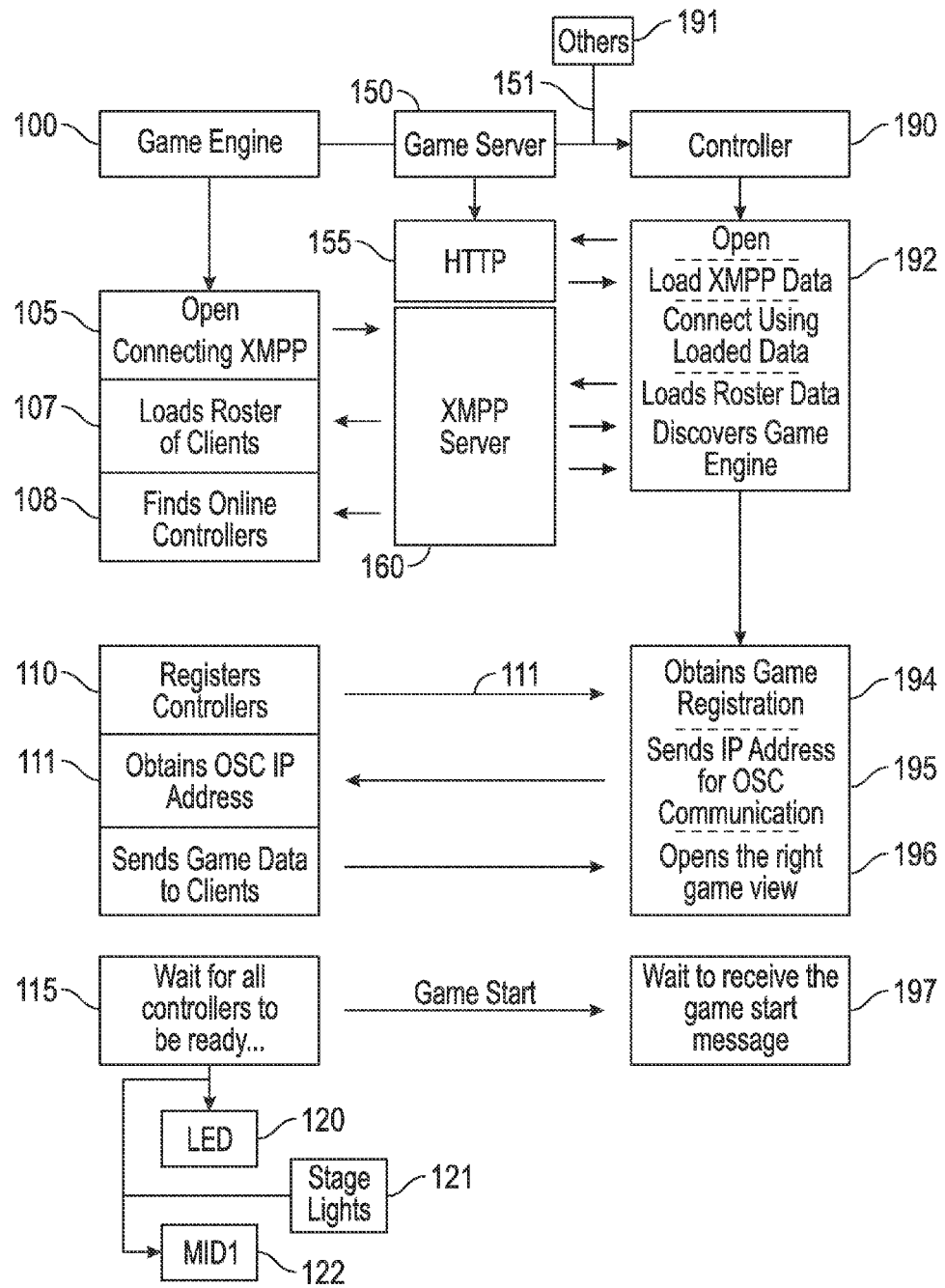
Figure 2:
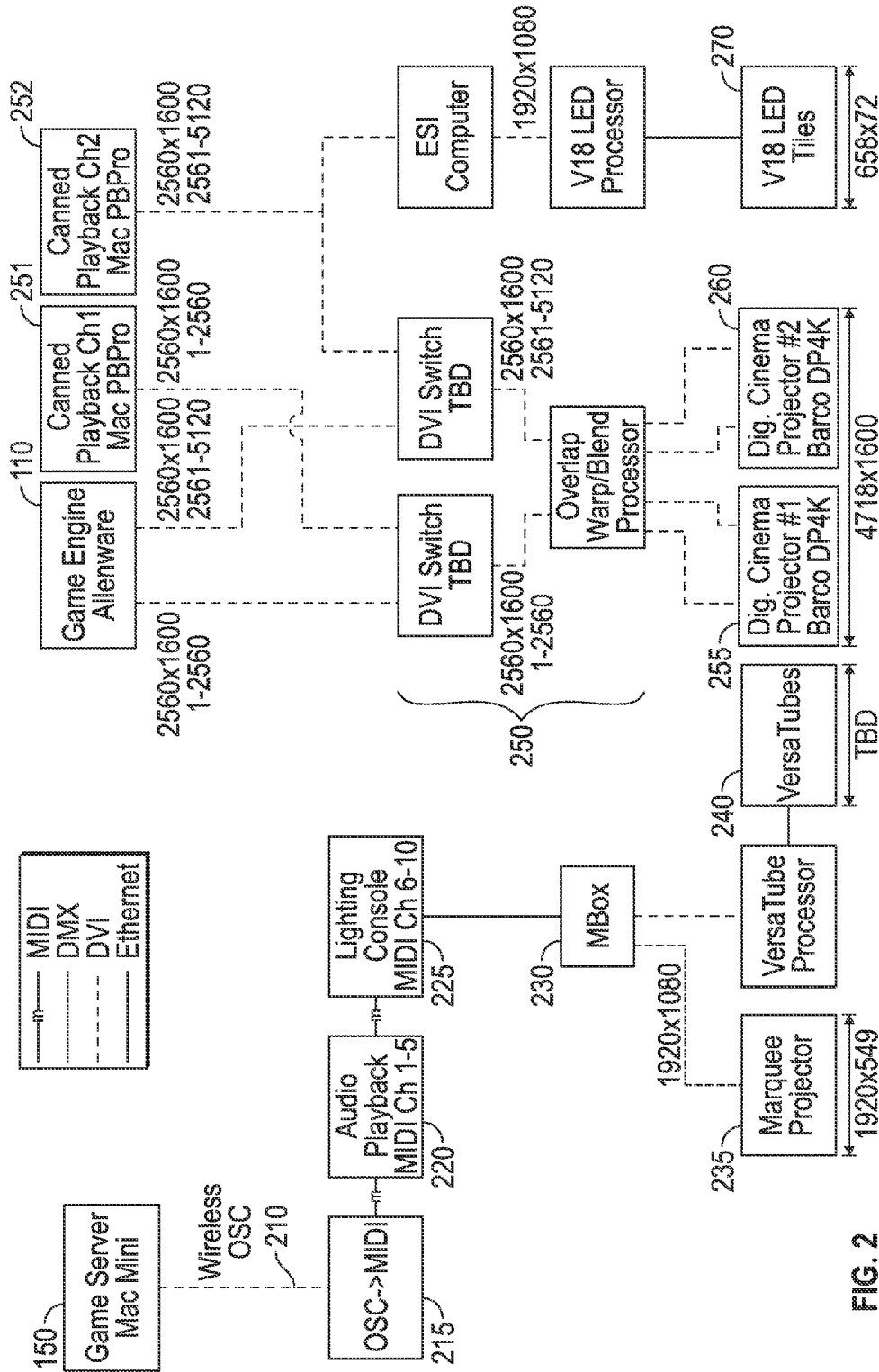
Figure 3:
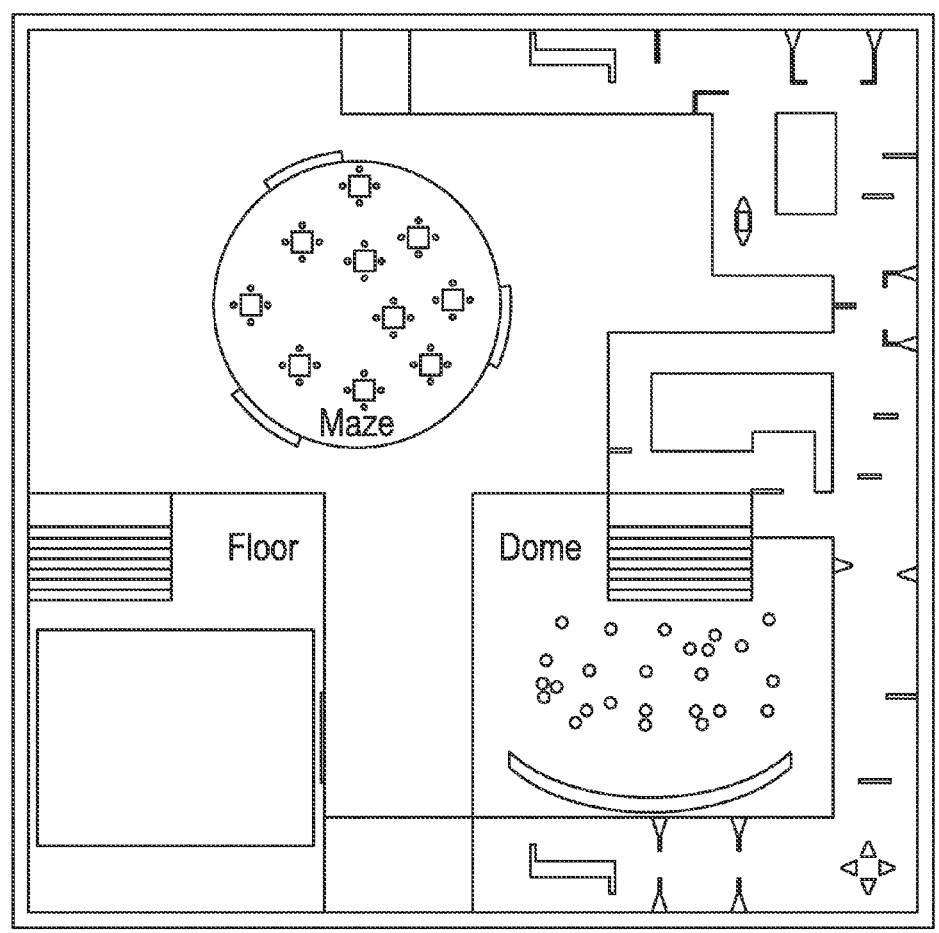
Figure 4:
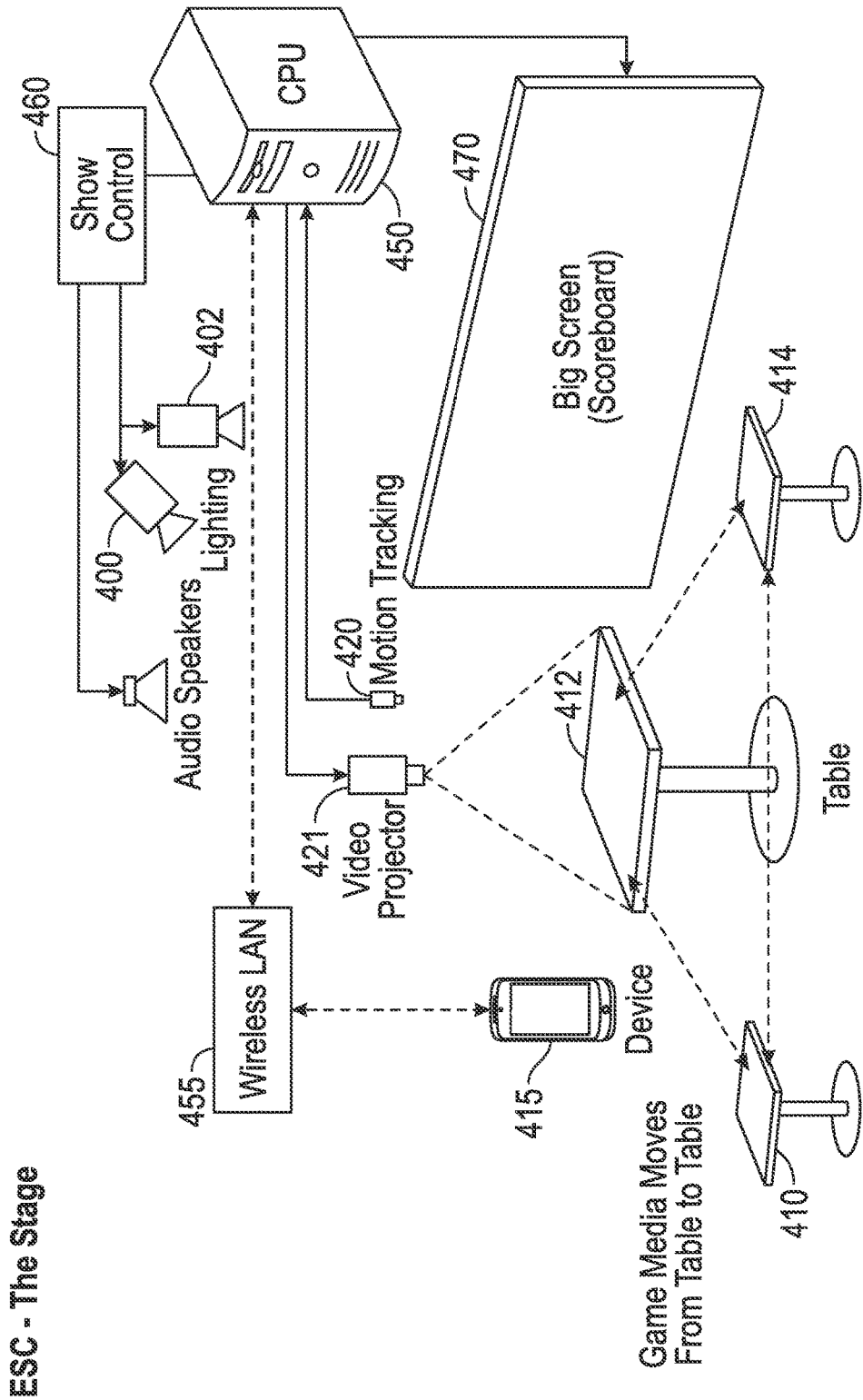
Figure 5:
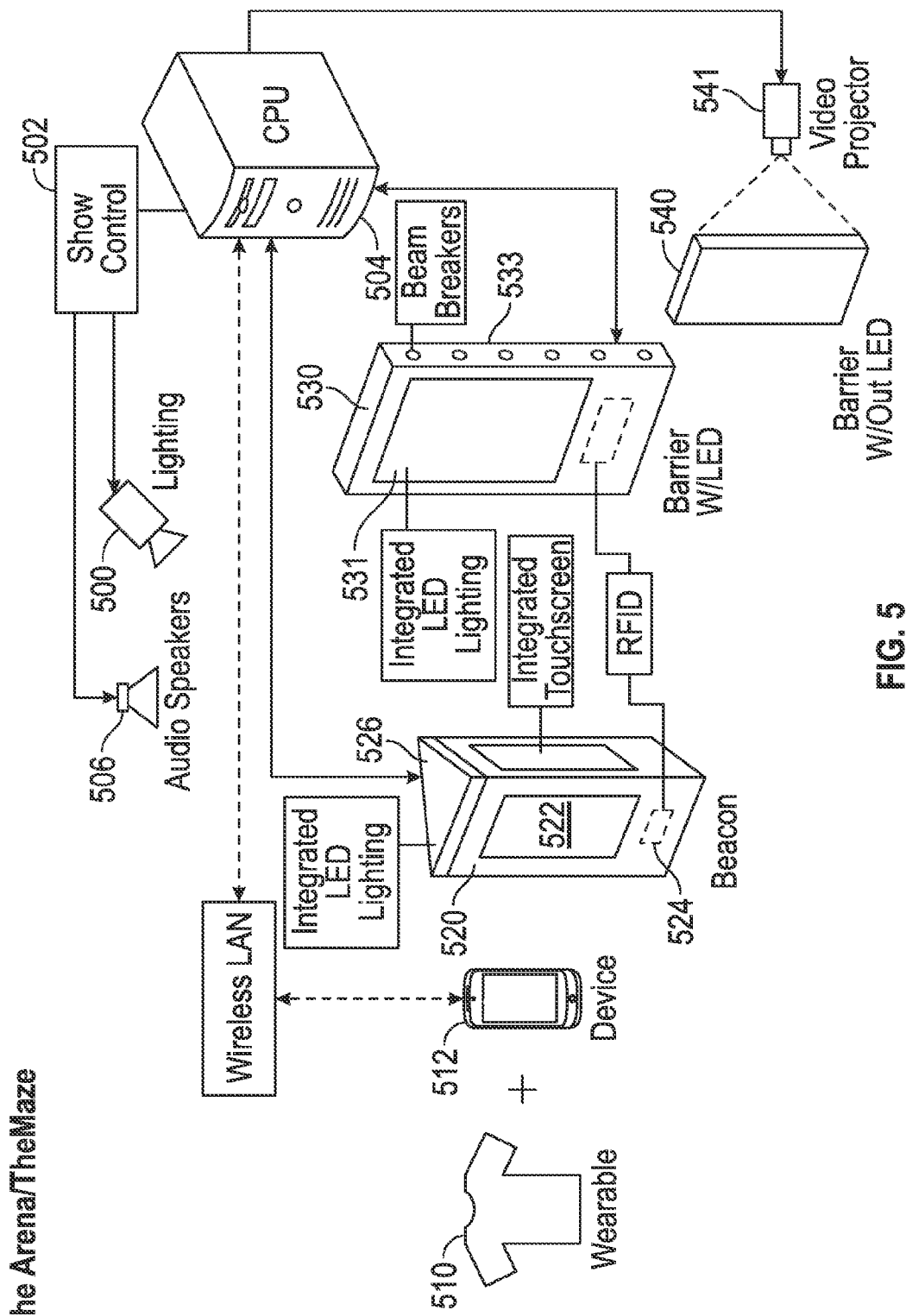
Figure 6:
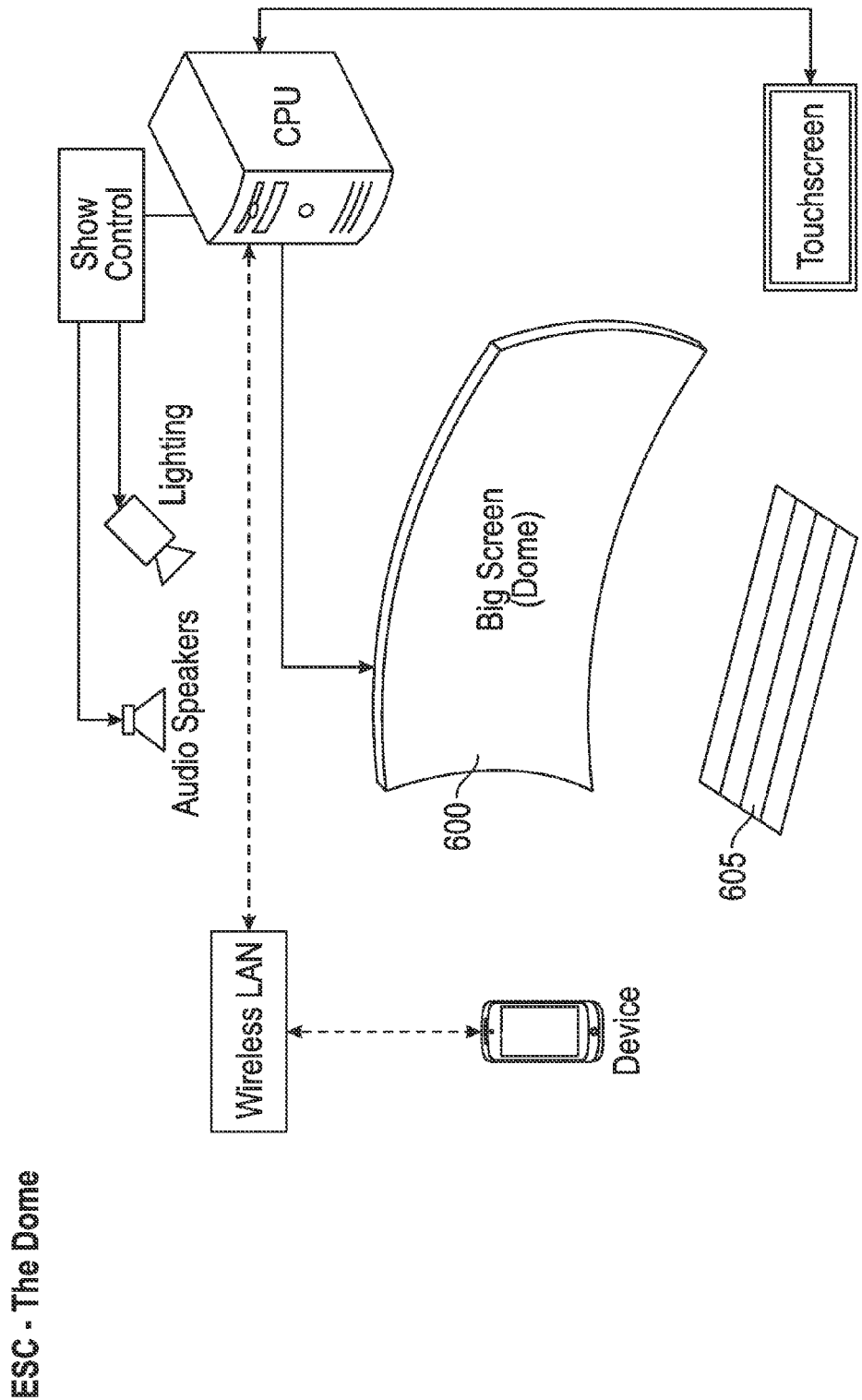
Figure 7:
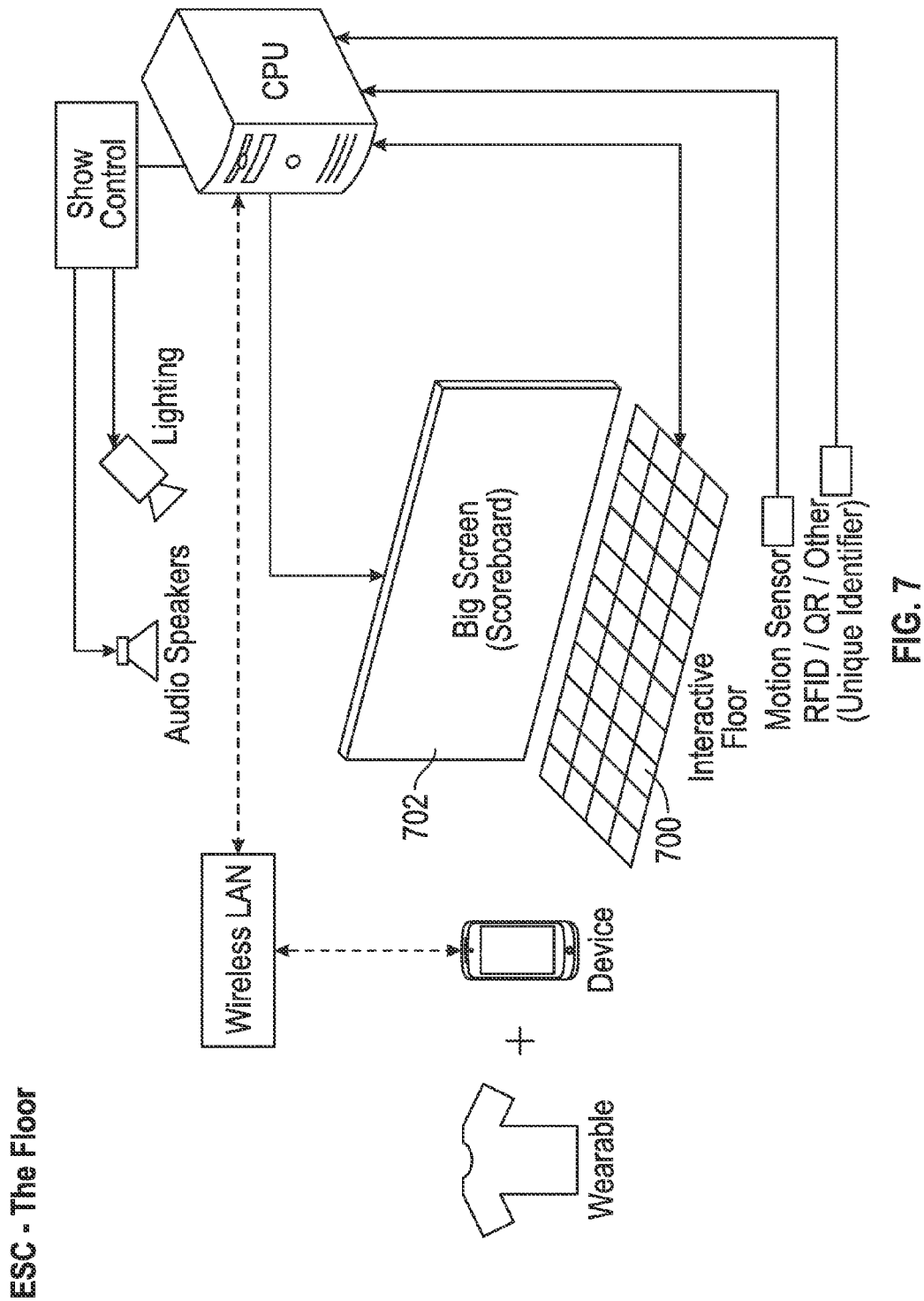

BRIEF DESCRIPTION OF THE DRAWINGS in the drawings:
the figures show aspects of the invention, where;
FIG. 1 shows a block diagram showing the operation of the interconnecting computers making up the invention;
FIG. 2 shows a block diagram of computers of an embodiment;
FIG. 3 shows a specific gaming room or area according to a first embodiment;
FIG. 4 shows a second gaming room or area called the stage;
FIG. 5 shows another gaming room or area which has barriers for detecting locations of people;
FIG. 6 shows another gaming room or area with a big screen dome;
FIG. 7 shows another gaming room with an interactive floor.

DETAILED DESCRIPTION

Embodiments described herein that uses multiple different cascading servers in order to carry out game functions in a special light and/or sound controllable room. The servers enable many different devices to be integrated into the game. One advantage of this system is that this enables peripherals to be used of a type which are not normally used in games.

For example, one embodiment describes producing stage lighting style cues as part of the game, where the stage lighting cues cause external stage lighting equipment to create effects that are based on things that happen in the game. In essence, the game controls the cues, thereby causing the game to control outputs that have previously been controlled only as part of the stage lighting system. This creates interactive stage lighting effects that become part of the game experience.

One aspect is that the game is specifically configured or "tuned" for a specific room. The specific rooms that can be used are described throughout this specification. In one embodiment, there can be a special gaming area, that has multiple different rooms for multiple different formats of games. The embodiments are shown in the figures and described herein.

FIG. 1 illustrates a flow of the game, and shows the interaction of the various servers. According to an embodiment, there are a number of controllers, and each player uses one controller. The controllers in this embodiment are portable computers with input capability and display screens and sound output. An embodiment uses an iPod touch controller, however, any portable computer can be used for this purpose.

As illustrated in FIG. 1, the basic system includes a game engine 100, connected to a game server 150, which is connected via a wireless connection 151 to one or more controllers. The controllers are shown as controller 190 and controller 191. The wireless connection can be any kind of connection, such as Bluetooth, Wi-Fi, or cellular.

In operation, the game server operates by starting two different connections. An HTTP connection 155 is initially used to discover and configure the controllers, such that subsequent communication can be directly from the game engine 100 discussed herein, to the controllers. The game server also starts an XMPP server 160 that sends messages back and forth to the controllers.

The HTTP server instructs the controller to open, and to load XM PP data as shown as 192 in FIG. 1. Roster data is then connected, and the XM PP server serves as a gateway to the game engine 100 which is operated as described herein. At 194, the controller then obtains game registration information directly from the game engine, and sends a unique address such as an IP address at 195. At 196 the controller opens the game view that is sent from the game engine.

The game engine flow is shown as on the left side of FIG. 1, where the system first opens and contacts the XM PP server. Each of the clients is a controller that has communicated with the XM PP server. At 107, the game engine loads a roster of those clients, and from that at 108 finds the online controllers. Different controllers can be online at different times. This presupposes that all the controllers have been preconfigured, but another embodiment can allow users to use their own units such as their own smart phones or tablets, and the action of finding the controllers and finding the roster may include finding the user's online controllers.

In one embodiment, the user's personal smartphone or tablet is used as the controller in the game. The game is carried out within a pay-to-enter facility also referred to herein as the multiplex, so the users must pay in order to go in. In one embodiment, when the users pay, actions are taken to automatically register the smart phone/tablet to allow that smart phone/tablet to interact with the game. In this way, two tiers of admission can be possible. People can be admitted but not allowed to play the games, in essence only spectators. Those people might be charged a first admission fee, which is a lower version of the admission fee. However, those users will be prohibited from interacting with the game. Users who want to play in the game are charged a different level, presumably higher, admission fee. This produces the advantage that the users can either accompany someone else who is playing without getting charged a higher rate, or can simply go in to look around. More details about the specific area are described herein as the different parts of the multiplex.

Once a controller is registered, at 110 game engine begins communicating directly via 111 to the registered controller. The game engine receives the controller's IP address at 111 and sends the game data to the clients, causing those clients to open their game view. When all controllers are ready at 115, again start message is sent to the controllers, and the controllers begin the game at 197.

In one embodiment, a number of different computers can be used as part of either the game engine or the game server, to communicate with external devices. One embodiment can be use an LED wall 120 to receive the game outputs, so that the LED wall becomes part of the game operation. Other outputs to other professional caliber devices can also be used. For example, outputs can be to the stage lights 121 or to MIDI 122. An embodiment can send MIDI information to an external MIDI device that may produce the sounds. Different outputs can send cue information, e.g., in DMX-512 format, to various parts in the room.

FIG. 2 illustrates a block diagram of the overall system, including the different parts of the system. The game server 150 communicates with the game engine 110 as described previously. In addition, the game server produces sound outputs 210 which can be in open sound control or OSC format. The OSC format outputs can be converted to MIDI by a converter 215. The MIDI outputs can create both audio playback via the MIDI controller and also an audio output 220. The OSC output can also create MIDI which creates lighting output via a lighting console 225. The lighting console 225 may control a stage lighting media server such as the M box 230. This in itself can control stage lighting projectors and lighting devices including a Marquee projector 235, as well as wash style lighting, such as the versa tubes at 240 which are light controllable and dimmable tubular elongated light devices.

The game engine may also produce outputs which are combined together by warp processors and DVI switches 250 with canned playback. For example, the canned playback may include different forms of playback shown as 251 and 252. The canned playback can be lighting cues, video output, or sound output. The output can also control cinema projectors 255, 260. In addition, this can control either directly or through a separate computer LED walls 207.

In essence, this becomes player controlled show control, where show control is used to control the aspects of the game under control of the game, and based on actions that occur in the game. Unlike previous systems in which the game designer created the content, this enables a lighting or audio designer to create content that is used in the game. The content created by the lighting or audio designer formed into a pallet of cues where each cue controls multiple different lighting devices and/or sound devices to create an effect. The game design selects one or more of those cues to be displayed. The cues can be sound, light, fog or any other stage controlled feature.

The sound can be played in the area, but can also be played on the handheld controlling device as part of the game. Lighting can also be controlled to appear on the screen of the mobile device.

Another aspect keeps track of the locations of the different controllers, within the area and uses the player's location in the real world as an input for the virtual world game. For example, if player 1 is at location x1, y1 in the area, the system can automatically determine that, and can produce game outputs that are directed to the area location x1,y1 to illuminate or make sounds to the player. In one game, for example, when the player meets a milestone, the player automatically receives certain sounds and/or a lighting effects such as a spotlight that shines on the player. In this embodiment, the system can keep track of the location of the player. When the player meets that milestone, the sound can automatically be played in that location.

Another embodiment describes an emulator, for the game, that shows what the game will look like with people in the room in the arena shown herein. This emulates the real space but also controls the real space.

An embodiment uses this system into form a multiplex gaming destination, that combines live action, digital, and social gaming in a spectacularly immersive environment. The multiplex embodiment described herein and as shown in FIG. 3, has four different game theaters, combined with a large restaurant and several smaller cafes and bars. The theaters in one embodiment are intended to be flexible, modular spaces equipped with immersive media capabilities. The four game theaters can include the World, the Arena, the Cabaret, the Floor, each described herein. Each theater supports a different gaming platform. These spaces also accommodate some form of queuing, which in most theaters acts as a comfortable viewing area for spectators as well.

Each of the different theaters can be an immersive theater with large screen projections and theatrical lighting and sound systems that together create a variety of "worlds." Players arrayed on an open floor in front of the screens, act together or individually to control what happens in the World. Each player uses a digital device—a tablet—to communicate with the screen. Holding the device in both hands, players move their avatars on the screen to direct the action. The devices have a vibration capability, which also creates tactile responses to play. The embodiment described herein describes different games which are intended for play in a different theater. A brief description of the games follows.

Game 1: Spotter Players see a changing crowd of recognizable celebrities on the large screen. A list of celebrities' names appears on each player's device, along with as unique hat avatar. Using their digital devices, players guide their hats across the large screen and onto the heads of celebrities. The player who gets the most hats on the most celebrities from his or her list wins the game. As the rounds progress, the numbers of celebrities increase, and the players receive Apples and Eggs to knock off other players hats, thus lowering their scores. Game 2: SnB On the large screen, players see thousands of particles streaming across the screen. Using a hand-held digital device, each player controls an on-screen Turret that sucks up the particles. By rotating the device, players try to position the Turret to suck up the most particles (thereby getting points). At the same time, they must avoid big, bad, red particles (which lose them points) by blowing them away. To do so, they tap a "blow" icon on their hand-held devices, which makes the Turret blow instead of suck. The players compete in two teams, with the winning team being the one with the most points after three rounds.

FIG. 4 illustrates a first gaming room referred to as the stage. This device includes tables and chairs along with environmental lighting with programmable spotlights. FIG. 4 shows only a few of these lights 400, 402, however it should be understood that there can be many of these lights. Any of these lights can be pan and tilt controllable lights. In addition to the lighting, there are also tables shown as 410, 412 and 414. The controller device shown as 415 can be moved from table to table, as the users move from table to table. Also, a motion tracking device 420 can detect the location of the device 415. Again, only one device is shown, although it should be understood that many different devices can be used in the system.

A video projector 421 is shown associated with the table 412, however, the different tables 410, 412, 414 can each include their own video projector or the video projector can be pan and tilt controllable. For example, this can use a digital light configured as a video projector.

In operation, the CPU 450 can include all or any of the controllers previously discussed. The CPU controls each of the devices according to the game engine. A wireless LAN device 455 communicates with each of the devices. In addition, the CPU produces show control outputs which control a show control device 460 such as a lighting console. Outputs from the console are displayed on the display screen 470.

The tables can be a series of multi-touch tables and a number of large displays. Players can use their tablets and the table as input devices for each game. The multi-touch table can detect discrete objects placed on the table and can distinguish between objects using unique identifiers which could be RFID based devices or the unique shapes of the items. Items from the bar/restaurant have built in identifiers and allow patrons to interact with the tables. The tables can also include touch screens. LCD touchscreen tables such as the Samsung SUR40 can be used to provide the required sensing technology. The large projection screen can be tied to the games on the tables or stand alone. Cameras provide live feeds and can pinpoint players and show them on the large projection; games are support by multi-channel audio and a theatrical lighting system.

FIG. 5 represents a different immersive environment referred to as the "arena". The arena includes raised floors with ramps that have environmental lighting. As in the stage, there can be multiple lighting devices shown as 500, controlled by the show control device 502 based on outputs from the CPU 504. Of course, the CPU 504 can be the same as the CPU 450. Speakers such as 506 can also be controlled in an analogous way. In this embodiment, users can wear a wearable device 510 such as a vest or necklace, and can also include their controller such as 512. The wearable device 510 can interact with the different barriers that are produced or located throughout the location. One such area was shown is 520, and this may include an integrated touchscreen 522 as well as an RFID device 524. The RFID device can be used to communicate with a corresponding RFID on either the device 512 or on the wearable device 510. The beacon device can also include integrated LED lighting which 526 which becomes part of the game. The beacon device 520 is shown as being substantially triangular in cross-section. There can also be other devices including the barrier device 530 which includes LED lighting 531, and other barrier devices 540 which do not include LED lighting. The barrier without LED lighting can be illuminated by a video projector 541.

Each of the barriers can include beam breakers shown as 533 which can track the location of the user.

Barriers can be internally illuminated, include a large touchscreen or be without display technology and act as a projection surface for ceiling mounted projectors. RFID readers, beam-break technology and a sturdy connector that allows physical props to connect to each barrier engage the player in physical challenges. Physical props include items such as balance beams, large button pads, scales, rope-swings, and laser beam break supported by a fog machine.

The overall space includes a multi-channel audio system to support the game play along with theatrical lighting. A players tablet and device allow them to input information, control interactions in the space, communicate, gather information, and identify players to one another.

The dome is shown in FIG. 6, and can include a large screen dome 600 in addition to or in place of the devices previously discussed. This device can include bleacher seating 605 so that all users can see the contents of the dome.

The floor shown in FIG. 7 can be an interactive floor 700 allowing the location on the floor to be used as part of the game.

In any and all of these embodiments, the user's locations can be tracked. when players visit the space, their position and game performance is tracked. Players that visit the space will, at a minimum, create a guest membership account to track stats and display accomplishments during a single play session. The full membership includes a profile that is created on-site or online that includes tracking of all achievements and actions, allowing for a fully customized and simplified experience. All transactions are then linked to the user's account, allowed the player to streamline everything from drink orders, to merchandise sales, to game sessions, to micro-sales. The profile includes meta-data about the player, a gaming handle, an avatar with customization capabilities, and all Meta data and game data.

All of these areas can allow users to interact with the games and each other. Devices and Touchscreens can control elements on the Big Screen through touch but also through a unique identifier. One approach for control is through tracking the unique identifier. The unique identifier can be a QR type barcode or an IR emitter that is either on the back of the device or on an attachment that connects to the device. The unique identifier will be detected using cameras or other sensing devices placed around the room. The device position and angle is able to be accurately detected so that it can control and interact with the main display screen in the area (e.g. the big screen 470 and stage, or the big screen 600 in the dome or the scoreboard 702 in the floor). The different rooms also include cameras or other kinds of movement detectors. When cameras are used, they can be used to allow for augmented reality moments in which the player sees themselves on the screen.

Each of the areas also includes a multi-channel audio system to support the game play along with theatrical lighting.

Therefore, all of the different areas have different layouts, but have a few things in common. All of these areas enable users to interact with the games from different locations within the layout. All of these have the ability to track the user's location in the layout, and to provide interaction with the user that is specific to the user's location. All of these have some kind of display, and while the display is different for the different locations, the display facilitates the user interacting with the game. In addition to the display, however, there are also position controllable lights, and also sound that is controllable by the game controller to different locations.

The specific games can be optimized for use in different specific locations. Two of the specific aims are described herein. The first game is called "spotter". This is a hidden picture game with trivia and competition intended to be played in the dome.

The story line is as follows:

Claim victory as an expert Spotter by placing hats onto famous heads. Can you find a Super Bowl Champion? A Hollywood Starlet? A famous monkey? Use your incredible eye to catch the recognizable pop crew from yesterday and today. Can you take the Top Spot?

The goal of the game is to place the most hats on the recognizable characters.

Group Goal

The goal for each round is to have the most hats at the end of the game in comparison with previous rounds and play sessions (see Best Scene Ever).

Setup

The world screen shows the People.

The players each receive an iPod Touch that acts as their Hat Deployer.

Description

Players start by logging into their iPod Touch, taking a picture of themselves, choosing an avatar, and choosing a hat. Their picture and hat instantly appear on the Scoreboard on the large display. They each are automatically given an assignment. Each assignment is simply a name or identifier for a person to "hat" on the screen.

The iPod Touch screen turns into a touchpad and a reticule/hat combination representing the player appears on the large screen. In order to complete assignments, players must move the avatar to particular "people" on the screen and place a hat on that person's head. The avatar is moved using the accelerometer in the iPod Touch.

The game is made up of three timed rounds and the player with the most hats at the end of the game wins.

Assignments

On the player's iPod Touch are slots for three assignments and an inventory. Assignments work on a branching structure—as players satisfy the requirements, new ones of a greater difficulty appear. There are also fewer assignments available as the players get to more difficult branches, which means that sometimes players are competing with one another to complete the same task (and be forced to stack hats). Players do not need to finish the assignments in any particular order and get a new one immediately upon finishing another one.

The Inventory

Items other than Hats, come in limited quantities. Each player has an inventory, which can hold Apples, Eggs, Pies, and Umbrellas. Some assignments reward the player with one or more items, as indicated on the Assignment List.

An endless loop of people dropping onto the screen and falling from the bottom. The people vary in size. At first in a traditional "large in front, small in back" faux 3D perspective, but then more and more random distribution of sizes.

People that have been "hatted" by a player will slowly recede into the background, but always stay present on the screen, unless an apple knocks off the hat. Assignment targets also recede into the background over time to make "hatting" them more difficult.

Hats Deployment

Each player has a hat deployer (iPod Touch) that they use to control the reticule on the screen. This deployer also shows the current assignments. Once a player puts the reticule on a person they need to find, they hit a button and the hat appears on that person. If a hat is already on a person, new hats are stacked (called hat stacking).

Players begin the game by choosing which type of hat they want to deploy and the type of reticule to control. Hats are unique per each player.

Scoreboard

The scoreboard is on the large display and shows each one of the player's faces along with their chosen hat. The scoreboard is ordered in real-time showing the player that has the most hats on the screen. As players place more hats, the scoreboard will reorder to show which player is in the lead.

Apples

Apples have the ability to knock a hat (or hats if they are stacked) off of a person on the screen. This affects the number of people the target player has "hatted" and affects their place on the scoreboard.

Pies

Pies come in a variety of flavors, which determine their color and longevity on the screen. If a player throws a pie at a person without a hat, that person cannot receive a hat until the pie drips off completely. People wearing hats are unaffected by pies.

Eggs obscure a large part of the screen—as if someone threw an egg at the physical screen. The entire spread slowly drips down and disappears after a set period of time. While an egg is on the screen, players cannot see any of the people behind the throw—which means that no hats can be placed while the egg is still blocking the view. Eggs can be used offensively or defensively.

Umbrellas can be placed above the head of a person on the screen (whether they are wearing a hat or not) and prevent anything bad from happening to them over a set period of time—this means they will not be affected by apples, pies, or eggs as long as the umbrella is present.

Shout Hints

Shout Hints allow a player to call out a specific name, such as "John Wayne," and have that person's head get larger on the screen, therefore making it easier to find. If nothing happens to an enlarged head after a set period of time (meaning that no one puts a hat on or throws an item at it), the head (and person) floats off of the screen. Each player starts with 2 Shout Hints at the beginning of the game.

Players can also get a hint by tapping on the assignment on the iPod Touch. This will bring up a picture of the target's face.

Hat Stacking

If a player has an assignment that already has a hat, they may stack their hat on top of that person as well. This is a risky move, however, because another player is more likely to use apples on stacked hats.

Errors

Players will undoubtedly make mistakes throughout the game and initiate a bad deployment. When this occurs, the hat simply falls away and is not placed on the incorrect target.

Rounds

There are three rounds of Spotter, varying in length between one and two minutes. Each set of rounds is named with a unique title (such as Cosmopolitan or Chieftain) and the date. This makes it easier for players to remember which games they participated in over time. At the end of each round, a round winner is announced and at the end of the game, the meta-goal Best Scene Ever is compared, before the next game begins.

Difficulty

As the game progresses and players complete more assignments, there are different ways that the difficulty increases.

1. The assignments use more difficult identifiers. Instead of having a person's name ("Barack Obama") it may have a piece of trivia ("The 44th President").

2. The speed in which new "people" that appear on the screen and then recede increases. Also, the total number of that particular target person on the large display decreases. This means that there may be 10 Barack Obama's in the first round, but only three in the third round, making him harder to find. Also, he gets smaller and farther "back" quicker than in earlier rounds.

3. The number of items in the game increases. Later assignments reward the players with more and more "griefing" items.

Ending the Game

After three rounds of play, the player with the most cumulative hats is "crowned" the winner and recognized on the large display. The final Best Scene Ever comparison moment occurs and the group's total success is shared.

Best Scene Ever

Once the game has completed, a snapshot of the scene is taken and compared to previous play sessions. The more hats present, the better that the group has done on the whole.

Game Scenario Narrative

Shawn enters the space with his friend Karen to play Spotter. Shawn's a big gamer, but Karen is not.

They receive an iPod Touch and see that the game is called Spotter. The room is filled with about 20 other players. The space is lit well and feels playful. The iPod Touch has instructions on how to continue.

They each take their picture and make selections as indicated on the iPod. Shawn chooses to use a Fez hat and the Wing reticule. Karen chooses a Sombrero hat and the Finger reticule.

Each of their pictures appear on the screen as part of the scoreboard. They are wearing the hats they chose.

A short introduction animation plays. They have to use the iPod to control the reticule on the screen. The players will be putting hats on celebrities to complete assignments—seems pretty easy, like a multi-player "Where's Waldo."

While the introduction is playing, Shawn and Karen are about to move their reticules around the screen. Shawn is a natural and Karen gets the hang of it pretty quickly.

The introduction finishes and pictures of people start appearing on the screen—some from the top, some from the bottom. They are big, small—sometimes even upside down. The whole scene is immersive and whimsical.

Karen looks at her three assignments: "Barack Obama," "Bugs Bunny," and "Frankenstein's Monster." She sees that her reticule is pretty close to John Lennon—so she hones in on him and puts the Sombrero on his head. There's a lighting flare, her iPod vibrates, and she gets points on the screen. The whole sequence is very exciting! A new assignment appears and she continues to play.

Later in the game, Shawn is behind and begins to frantically finish assignments, sometimes stacking hats onto people with hats already there. In a short period of time, he hats Michael Jordan, Michael Phelps, Shawn Johnson, Usain Bolt, and Muhammad Ali.

Karen gets frustrated trying to find John Wayne. She's been holding onto that assignment since the beginning of the round. She uses a Shout Hint and shouts his name. His head gets really big, but before she can put a hat on it, someone throws a pie at his face, blocking her!

Shawn wins the first round and Karen comes in second in the second round. Karen would have won, but someone used an apple to knock off a stack of hats that included her sombrero!

The timer appears during the third round and in the final moment, Shawn is able to place a hat to complete a very difficult assignment and take the lead. Karen gets eighth place, which isn't that bad considering it was her first time.

The entire group's effort is compared to other play sessions and it turns out that they placed more hats than any other group. The entire audience cheers.

The outro animation happens and players return the iPods while the space transitions to an intermission moment.

Moment-By-Moment Player Description
Player enters the World
Player sees the big screen displaying ambient imagery and animation
Player receives an iPod Touch
Player receives instructions on how to continue via the iPod
Player takes her/his picture
Player selects a hat
Scoreboard is populated with player's face and hat
Player selects a reticule
Player uses the iPod to control the reticule on the screen
Player is instructed to wait until all players have joined the game
A short introduction animation plays when all players have joined
The screen is populated with "people"
Player receives a one assignment (eventually getting three)
Round 1 begins
Player looks for the right faces
Player finds a face
Player directs the reticule to the face
Player deploys a hat to the face—it is the correct face
A positive environmental sound is triggered
A lighting flare emits in the World
Player's iPod vibrates
Player looks for faces
Player finds a face
Player directs reticule to the face
Player deploys hat to the face—it is the incorrect face
A negative environmental sound is triggered
Player's iPod vibrates
Player finishes first two rounds
A timer appears on screen in the final moment
Player wins or loses
Player sees scoreboard appear on screen
Scoreboard includes individual scores and the group score
The group's success is compared with previous sessions
The outro animation begins
The intermission moment begins The next game is a Time Based Flow called Spotter.

Pre-Game 1. iPod Touches are placed face up on a table with the Spotter app pre-loaded. The face of each player is on a screen or, in the case of a player with a missing picture, a silhouette.

2. The players each pick up the iPod that displays her or his face. Before a single player hits "Ready," the large display is a closed curtain with the Spotter Logo on it.

3. The players move out onto the floor in front of the large display and hit "ready." When a player hits "ready," their face or silhouette (if no face available) appear on the scoreboard. Then their hat reticle appears at the middle of the screen and sweeps up to the player's score "icon." They are able to move the reticle around the screen and place a hat on any of the three characters on the screen while waiting for the other players. They are also able to "stack hats" and throw apples to clear away the hats on a character's head. If the hat stack gets too high, it is automatically cleared.

On the first "Ready" click, the curtain pulls back to reveal 3 characters that can receive hats.

There is text and imagery on the screen that says, "Practice putting hats onto character's heads and using apples to knock the hats off. You can also stack hats—give it a try!"

Countdown

4. When the final player hits "ready," a 20 second countdown appears (this may be adjusted). The countdown gives the last player a chance to move around the screen and get acquainted with the system before the game begins. Each player is given her or his first assignment—a single name that becomes active when the countdown ends.

After the final player hits "Ready," a 20-second countdown begins.

After 15 seconds, the curtain closes and displays this text, "Check your assignments now and good luck!"

5. During the last 5 seconds of the countdown, the curtain starts opening slowly. During this time, players cannot place hats until the timer has completed. The screen is slightly dimmed with the reticles at full brightness so players do not lose their spot. A sound and lighting flourish trigger the beginning of the game.

When the final five seconds are done, the curtain pulls back and the game begins.

Round 1

6. The first round lasts two minutes. Players start with a single assignment. When they have completed the assignment, two more appear. When they have completed one more assignment (the second assignment since the beginning of the game), two more assignments appear. Once they have three total assignments, players will have three assignments for the rest of the game. If a player does not "unlock" a second or third assignment slot during the first round, they will have to "unlock" them in a subsequent round.

The bottom LED acts like a ticker with information about what is happening on the screen. The information is all character-based.

Information is triggered whenever a character is hatted, hit by an apple or hit by a pie.

Text for being hatted, "[Character Name] is now wearing a [hat name]!"

Text for being apple'd, "The [hat name] (and [hat name] . . . If stacked) was totally knocked off of [character name] using an apple!"

Text for being pied, "[Character name]'s face is covered in pie!"

7. The first round only has Hats and Apples as available options to the player. Each player has unlimited Hats and begins with a single Apple. As the round progresses, Apples are rewarded every so often for successfully completed assignments.

8. The scoreboard updates in real time as players place hats successfully or the hats are knocked off.

Round 1 Countdown

9. Round 1 ends with a 10 second countdown. A rush of wind blows across the physical space and the virtual space, clearing all of the non-hatted characters (or all of the characters).

Each round ends with a 10 second, on-screen countdown.

The first round ends with a huge gust a wind moving across the screen.

Each round end concludes with the curtain closing.

First Intermission

10. The large display then shows a 20 second countdown (this may be adjusted) until Round 2 begins. The screen shows new instructional text about what is happening in Round 2, specifically that there will be more characters, character transitions are faster, and Apples are active. In addition to the instructional text, the top 3 players are highlighted in the center of the large display. Halfway through the countdown, players receive brand new assignments.

The top 3 players are shown on the screen, starting with #3, then revealing #2, and #1.

The first intermission displays this text on the screen, "Characters appear and disappear faster—and watch out for apples!"

11. During the last 5 seconds of the countdown (to be finalized in testing), the curtain slowly opens. During this time, players cannot place hats until the timer has completed. A sound and lighting flourish trigger the beginning of Round 2.

Round 2

12. Round 2 is 1 minute and 30 seconds long (to be finalized in testing). The round has a higher frequency and variety of "surprises" that move across the top section of the large display.

Round 2 Countdown

13. Round 2 ends with a 10 second countdown. An earthquake clears all of the non-hatted characters (or all of the characters).

Each round ends with a 10 second, on-screen countdown.

The second round ends with Godzilla crossing the screen.

Each round end concludes with the curtain closing.

Second Intermission

14. The large display then shows a 20 second countdown (this may be adjusted) until Round 3 (the final round) begins. The screen shows new instructional text about what is happening in Round 3, specifically that there will be more characters, character transitions are even faster, and Pies and Eggs are active. In addition to the instructional text, the top 3 players are highlighted in the center of the large display. Halfway through the countdown, players receive brand new assignments.

The top 3 players are shown on the screen, starting with #3, then revealing #2, and #1.

The second intermission displays this text, "Pies knock the hat off of a player's head and Eggs splatter all over the screen!"

15. During the last 5 seconds of the countdown, the curtain slowly opens. During this time, players cannot place hats until the timer has completed. A sound and lighting flourish trigger the beginning of Round 3.

Round 3

16. Round 3 is 1 minute and 15 seconds long. The round introduces eggs and pies (and does not have apples), the highest frequency and variety of "surprises" that move across the top section of the large display, and the most density and transition speed of characters. Round 3 Countdown 17. Round 3 ends with a 10 second countdown.

Each round ends with a 10 second, on-screen countdown.

The third, and final, round ends with an eruption, which just displays smoke coming up from the bottom of the display and fog filling the space.

Each round end concludes with the curtain closing.

End of Game

18. Fog fills the space and moves across the screen. The final score is revealed on the large display, particularly highlighting the top 3 hatters. In addition, the group's score is compared to all other play sessions and ranked.

Between Game Intermission

1. The large display transitions from the end state of the game to a looping video that gives the atmosphere of a social club. The lighting and sound transition to allow for social activities, such as dancing, talking and drinking. The players return their iPods to the facilitators so they can be loaded with the next game. A countdown until the next game appears on the screen (roughly 2-3 minutes).

The SnB game is described as follows:

This can be played in the "World" part of the ESC.

Story Pitch

Beneath a haze of chaos lies a secret prize—two teams battle to uncover the mystery and conquer the World by using sophisticated vacuum technology. Only one group will dominate and be the ultimate suckers!

Goal

To score the most points for your team before the reveal.

Setup

The World Screen shows a moving particle system with other objects along with a grid of Turrets.

The Floor indicates different "spaces" to stand to control the Turrets.

The Players receive an iPod Touch that controls the Nozzle on the Turret.

Players start by splitting into two teams and choosing a position on the floor in front of the large screen. Each of the spaces on the floor corresponds to a turret on the screen. Players register their spot to control the particular turret and assign that turret to their team.

The screen displays a large particle array with two main types of objects floating across the entire space: (1) particles and (2) hazards. The iPod Touches display a switch that allows the players to change from suck to blow, as well as a variable slider for controlling the concentration of the "power"—whether it's a narrow and strong beam or a weaker, but spread out beam.

The goal of the game is to gain the most points before the hidden object is completely uncovered. Particles score a minimal amount of points, bonus objects score significantly more and hazards take away points, as well as some other annoyances.

Turrets

Each player controls a turret, which is in a fixed position on the screen. The turret configurations may vary depending on round. Turrets cannot move. Each turret has a single "nozzle" that the players control.

Nozzles

Nozzles are attached to turrets and can move 360°. The nozzle can vary in suck/blow strength by changing the width—a wider nozzle allows larger objects to be sucked in and distributes the power to a larger swath, but also is weaker; a narrow nozzle allows smaller objects to be sucked, but concentrates the strength as a strong beam.

Teams

There are two teams that play SnB: Red versus Blue. Each team gets to choose which turret they want to control at the beginning of the game. Beginners will have a more random distribution, while those that have played a couple of rounds will seek out specific spots for them and their teammates. Teams need to work together to bring in the most points—by grabbing larger particles together and repelling larger hazards together.

The more points that an individual player accumulates, the greater the power their nozzle has. Essentially, the more players "suck," the more they can "suck" (and blow).

All objects on the screen, except for the turrets, "float" as if in a shallow pool of water. The larger objects have a weight to them that makes them more difficult to move. Some particles (in later rounds) have interesting shapes, such as rods, which can spin through the space and have varying levels of resistance depending on the angle of the pull or push.

Any particle, depending on size, can get stuck in a nozzle. The player must either blow that object away (if it is too large) or can adjust the size of the nozzle to accommodate the larger mass.

Give the player points based on the size of the particle. Larger particles=more points. It can be odd shapes in later rounds. The system takes away points based on size. Larger particles=more points taken away.

There are also a number of hazards. Point Loss—Lose 300 points if swallowed. Power Decrease—Temporarily lose power. Nozzle Blocker—Temporarily lose the ability to swallow. Confuser—Temporarily have controls reversed. Blinders—Temporarily be covered The most plentiful object on the screen is particles of varying sizes that float around and can be sucked or blown by the nozzles. Particles have a point value based on size—the larger the particle, the higher the value. Particles are either positive (meaning they reward the player with points) or negative (meaning they take away points). The more points a player has, the stronger their nozzle.

Game Scenario Narrative

Nancy enters the ESC World space and receives an iPod Touch. She's never played a game like this before, so she's a bit nervous.

The game is called SnB. She is given the option of choosing one of two teams or just selecting "Place me on a team." She is put on the Blue team.

The iPod then asks her to select a Turret position. She really doesn't know how that will affect the outcome of the game, so she selects "Pick one for me" and follows the instructions. She has to go stand on a space on the floor indicated by a bright spotlight.

Once in her spot, Nancy is able to move the turret around on the large screen. That part is really easy. There are other controls on the iPod, but she knows she has the basics down. The space is very large with a couple dozen other players finding their spots.

The game starts with an intro animation and the instructions, which seem pretty each. Use the iPod to control a turret. Use the turret to suck up positive particles (that are blue) and blow away negative particles (that are red). The larger the particle, the more points you gain or lose. There are also hazards, which look different, so it's best to avoid those altogether.

Nancy understands the basic idea. She wants her team to win, so she's very into avoiding the bad stuff. The game starts with very few hazards or negative particles, which makes it pretty easy. Nancy learns that by adjusting the nozzle size, she can change the width and power of the vacuum. This gives her a lot of control over her success. She can even feel the particles being sucked into her device.

The particles start getting larger and heavier, which makes the game much more difficult. Nancy starts shouting to her teammates to work together. If she uses her nozzle to blow good particles toward other blue turrets, the team will win.

Nancy accidentally sucks up a Confuser Hazard. For a short period of time, all of her controls are completely reversed, which makes the game very difficult and frustrating.

Just as Nancy regains complete control of her turret, a Weather Hazard starts to affect the entire system. Particles start moving in waves across the screen, making them harder to predict and capture.

An image begins to appear behind the particles and the final countdown begins. The Blue team pulls a last minute win because they manage to capture a lot of high-scoring large particles by working together.

A figure appears from behind the screen, revealing a photo of a guy's umbrella being pulled away by a large gust of wind. The group cheers and is anxious to play again.

Time Based Flow: SnB (Demo Edition)

Pre-Game 1. iPod Touches are placed face up on a table with the SnB app pre-loaded. The "Turret Map" symbols are reflected onto the floor using gobos. The large display shows the SnB logo.

2. The players pick up an iPod and walk to the corresponding spot on the floor. When they are in the correct space, they hit "ready" on the iPod screen.

3. Once the final player hits "ready," the large display zooms into the globe at the center of the logo and all of the turrets appear on the display. The players are able to move their turret on the large display. There are no particles present during this period, so the player simply learns how to spin the turret and has an opportunity to strategize with other team members. Additionally, instructional text and a 20 second countdown are at the center of the large display. During the last 5 seconds of the countdown, each team is individually highlighted using lighting effects.

The instructional text at the center of the large display is, "Tilt your controller to move your turret. The team with the highest score wins the game—each particle type is described on your iPod!"

The instructional text disappears when the particles begin to fill the large display.

Stage 1

On completion of the countdown, particles begin appearing on the large display and Stage 1 is triggered. There are 4 "stages" to the game that go back to back without interruption.

5. Stage 1 consists entirely of positive particles. The players can adjust the strength of their suction power and use a blow "pulse" as needed (although it will not be necessary during Stage 1). As the players suck up positive particles, the LED below the large display shows the team score as a "tug of war" style color band. The turrets also display each player's score as the game progresses.

Stage 2

6. Stage 2 begins roughly 1 minute after the beginning of the game. The lighting and sound in the space shift to signal a mood change and negative particles are introduced.

Stage 3

7. Stage 3 begins a minute after the beginning of Stage 2. Hazards are slowly introduced into the system in the following order: Point Loss, Power Decrease, and Nozzle Block (push only). Each hazard looks different and is explained in the center column on the iPod. The lighting and sound in the space shift to signal a mood change.

Stage 4

8. Stage 4, the final stage, begins a minute after the beginning of Stage 3. This stage has two parts. The first part of Stage 4 introduces global hazards such as wind. 30 seconds into Stage 4 triggers the finale, wherein no new particles are introduced into the system. Each change is signalled using a lighting and sound shift.

Although only a few embodiments have been disclosed in detail above, other embodiments are possible and the inventors intend these to be encompassed within this specification. The specification describes specific examples to accomplish a more general goal that may be accomplished in another way. This disclosure is intended to be exemplary, and the claims are intended to cover any modification or alternative which might be predictable to a person having ordinary skill in the art. For example, other kinds of games can use the techniques described herein.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments.

The various illustrative logical blocks, modules, and circuits described in connection with the embodiments disclosed herein, may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. The processor can be part of a computer system that also has a user interface port that communicates with a user interface, and which receives commands entered by a user, has at least one memory (e.g., hard drive or other comparable storage, and random access memory) that stores electronic information including a program that operates under control of the processor and with communication via the user interface port, and a video output that produces its output via any kind of video output format, e.g., VGA, DVI, HDMI, displayport, or any other form. This may include laptop or desktop computers, and may also include portable computers, including cell phones, tablets such as the IPAD™, and all other kinds of computers and computing platforms.

A processor may also be implemented as a combination of computing devices, e.g., a combination of a DSP and a microprocessor, a plurality of microprocessors, one or more microprocessors in conjunction with a DSP core, or any other such configuration. These devices may also be used to select values for devices as described herein.

The steps of a method or algorithm described in connection with the embodiments disclosed herein may be embodied directly in hardware, in a software module executed by a processor, using cloud computing, or in combinations. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of tangible storage medium that stores tangible, non transitory computer based instructions. An exemplary storage medium is coupled to the processor such that the processor can read information from, and write information to, the storage medium. In the alternative, the storage medium may be integral to the processor. The processor and the storage medium may reside in reconfigurable logic of any type.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer.

The memory storage can also be rotating magnetic hard disk drives, optical disk drives, or flash memory based storage drives or other such solid state, magnetic, or optical storage devices. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. The computer readable media can be an article comprising a machine-readable non-transitory tangible medium embodying information indicative of instructions that when performed by one or more machines result in computer implemented operations comprising the actions described throughout this specification.

Operations as described herein can be carried out on or over a website. The website can be operated on a server computer, or operated locally, e.g., by being downloaded to the client computer, or operated via a server farm. The website can be accessed over a mobile phone or a PDA, or on any other client. The website can use HTML code in any form, e.g., MHTML, or XML, and via any form such as cascading style sheets ("CSS") or other.

Also, the inventor(s) intend that only those claims which use the words "means for" are intended to be interpreted under 35 USC 112, sixth paragraph. Moreover, no limitations from the specification are intended to be read into any claims, unless those limitations are expressly included in the claims. The computers described herein may be any kind of computer, either general purpose, or some specific purpose computer such as a workstation. The programs may be written in C, or Java, Brew or any other programming language. The programs may be resident on a storage medium, e.g., magnetic or optical, e.g. the computer hard drive, a removable disk or media such as a memory stick or SD media, or other removable medium. The programs may also be run over a network, for example, with a server or other machine sending signals to the local machine, which allows the local machine to carry out the operations described herein.

Where a specific numerical value is mentioned herein, it should be considered that the value may be increased or decreased by 20%, while still staying within the teachings of the present application, unless some different range is specifically mentioned. Where a specified logical sense is used, the opposite logical sense is also intended to be encompassed.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An interactive game system, comprising:
a computer, operating as a game engine to run a computer based game, said computer communicating with a plurality of controllers to receive information about player actions in the game from each of the plurality of controllers,
the information about player actions including multiple actions, each of the multiple actions being taken by a player in the game on the controller, and the computer operating to send game data to the plurality of controllers,
and said computer producing outputs including stage lighting cues as part of playing of the game,
where the stage lighting cues produced by said computer as part of playing of the game are in a form where each stage lighting cue controls a pointing position of a pan and tilt controllable external stage lighting device to create a lighting effect that is based on said player actions that are received by the computer, from the controllers, where each said lighting effect changes an illumination of a room,
wherein said computer also detects positions of multiple different controllers in the room that are playing the game, and further comprising a screen which is located to be viewed by multiple of said players, said screen controlled by said computer, and a camera, and where said camera pinpoints players and shows information from the camera on the screen.

2. The system as in claim 1, wherein said computer also detects positions of multiple different controllers in the room that are playing the game, and said outputs are based on said positions, where the computer determines based on gameplay if a first controller has met a first milestone in the game, determines a first position of the first controller that has met the first milestone in the game, and creates an output that causes illumination of said first position by multiple external stage lighting equipment without causing illumination of other positions other than said first position.

3. The system as in claim 2, wherein said outputs also control the first controller to display a lighting effect on a screen of the first controller responsive to said first controller having met the milestone in the game.

4. The system as in claim 3, wherein said outputs also control the first controller to play a sound effect on the first controller responsive to said first controller having met the milestone in the game.

5. The system as in claim 2, wherein the positions of multiple players are detected by tracking positions of multiple controllers.

6. The system as in claim 2, wherein said players use wireless controllers to interact with the game, and the positions of the players are detected by tracking the wireless controllers.

7. The system as in claim 1, wherein said players use wireless controllers to interact with the game and at least some of the information about the player actions in the game is received from said wireless controllers.

8. The system as in claim 7, wherein the computer maintains a roster of multiple different authorized controllers, and determines which of said authorized controllers are currently connected, to register each of the controllers that are currently connected and send game information to said those of the controllers that are currently connected.

9. The system as in claim 8, wherein the computer operates to wait for all registered controllers on the roster to become ready, and then starts a game by sending a message of game start to all the registered controllers on the roster, and the computer not starting the game before the registered controllers have become ready.

10. The system as in claim 7, wherein the stage lighting cues produce a lighting effect just directed at one specific player and not directed at other players other than the one specific player, and said computer also produces an output that produces a similar lighting effect on a screen of the user's controller.

11. The system as in claim 7, further comprising producing an audio output directed at only a portion of a room in which the specific player is located, and said computer also produces an output that produces a similar audio effect on the user's controller.

12. The system as in claim 11, wherein said computer also detects positions of multiple different controllers in the room that are playing the game, where one of said cues includes a spotlight that shines on a location of a specific controller based on detecting the position of the specific controller and controlling and said outputs are based on said positions, and wherein said effect includes the spotlight shining on the location of the specific controller based on detecting the position of the specific controller.

13. The system as in claim 1, further comprising a processor that operates to detect a location of a first user who is playing the game, and creating an action responsive to said first user who is playing the game that is not intended for other users other than said first user who is playing the game, and wherein said cues are sent to external equipment at a location of said first user, where one of said cues includes a spotlight that shines on a location of a first user based on detecting the position of the first user.

14. A combination of equipment, having structure that interacts with a game that is being played by multiple different users in an area of the equipment, comprising:

a visual output production device, producing visual outputs in said area, said visual outputs being part of the game being played by multiple different users in the area;

an audio output device producing audio outputs in said area, as part of the game being played by the multiple different users;

a computer, that detects multiple different controllers of the multiple different users, and maintains a list of authorized controllers, and allows only those users with authorized controllers to interact with the game, and prevents users that do not have authorized controllers from interacting with the game, wherein the computer enables a controller to become an authorized controller, where said computer tracks positions of each of the authorized controllers, and where the computer detects actions in the game that are based on a user interaction with an individual controller, by receiving information from the individual controller, and sends a signal indicating that lighting effects should be illuminated on a screen of the individual controller based on actions in the game taken by the individual controller, and where said lighting effects sent to the individual controller are different than lighting effects sent to other controllers, wherein said computer also detects positions of multiple different controllers in the room that are playing the game, and further comprising a screen which is located to be viewed by multiple of said users, said screen controlled by said computer, and a camera, and where said camera pinpoints users and shows information from the camera on the screen.

15. The combination as in claim 14, wherein said controllers are portable telephones.

16. The combination as in claim 14, wherein the visual output production device and the audio output device produce effects that interact with the game, wherein the area has props at different locations in the room that interact with the game.

17. The combination as in claim 14, wherein said computer operates to detect a location of a first user who is playing the game, and creating an action responsive to said first user who is playing the game that is not intended for other users other than said first user who is playing the game, and wherein said cues are sent to external equipment at a location of said first user, where one of said cues includes a spotlight that shines on a location of a first user based on detecting the position of the first user.

* * * * *